(12) United States Patent
Troy et al.

(10) Patent No.: US 11,042,322 B2
(45) Date of Patent: Jun. 22, 2021

(54) SSD SUPPORTING LOW LATENCY OPERATION

(71) Applicant: Toshiba Memory Corporation, Tokyo (JP)

(72) Inventors: Sebastian Troy, Abingdon (GB); Brian Clarke, Abingdon (GB)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/570,724

(22) Filed: Sep. 13, 2019

(65) Prior Publication Data

US 2021/0081135 A1 Mar. 18, 2021

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0679; G06F 3/0604; G06F 12/0246
See application file for complete search history.

(56) References Cited

U.S. PATENT DOCUMENTS

| 10,521,121 | B2* | 12/2019 | Carlton | G06F 3/061 |
| 2017/0285945 | A1* | 10/2017 | Kryvaltsevich | G06F 3/0659 |
| 2017/0300263 | A1* | 10/2017 | Helmick | G06F 3/0679 |
| 2018/0081590 | A1* | 3/2018 | Farahani | G06F 13/1673 |
| 2018/0188952 | A1* | 7/2018 | Carlton | G06F 3/061 |
| 2019/0278498 | A1 | 9/2019 | Dedrick | |

* cited by examiner

*Primary Examiner* — Sean D Rossiter
(74) *Attorney, Agent, or Firm* — White & Case LLP

(57) ABSTRACT

A method of managing writing data to a Solid State Drive (SSD). The method includes determining a remaining capacity of an event queue for queuing write commands for execution by the SSD. Dynamically setting an ingress throttle rate of write commands, transferred from a host interface to the event queue based on the remaining capacity of the event queue, during the operation of then SSD and transferring the write commands to the event queue at ingress throttle rate. The method also includes inputting write data associated with the write commands into a write data buffer.

20 Claims, 7 Drawing Sheets

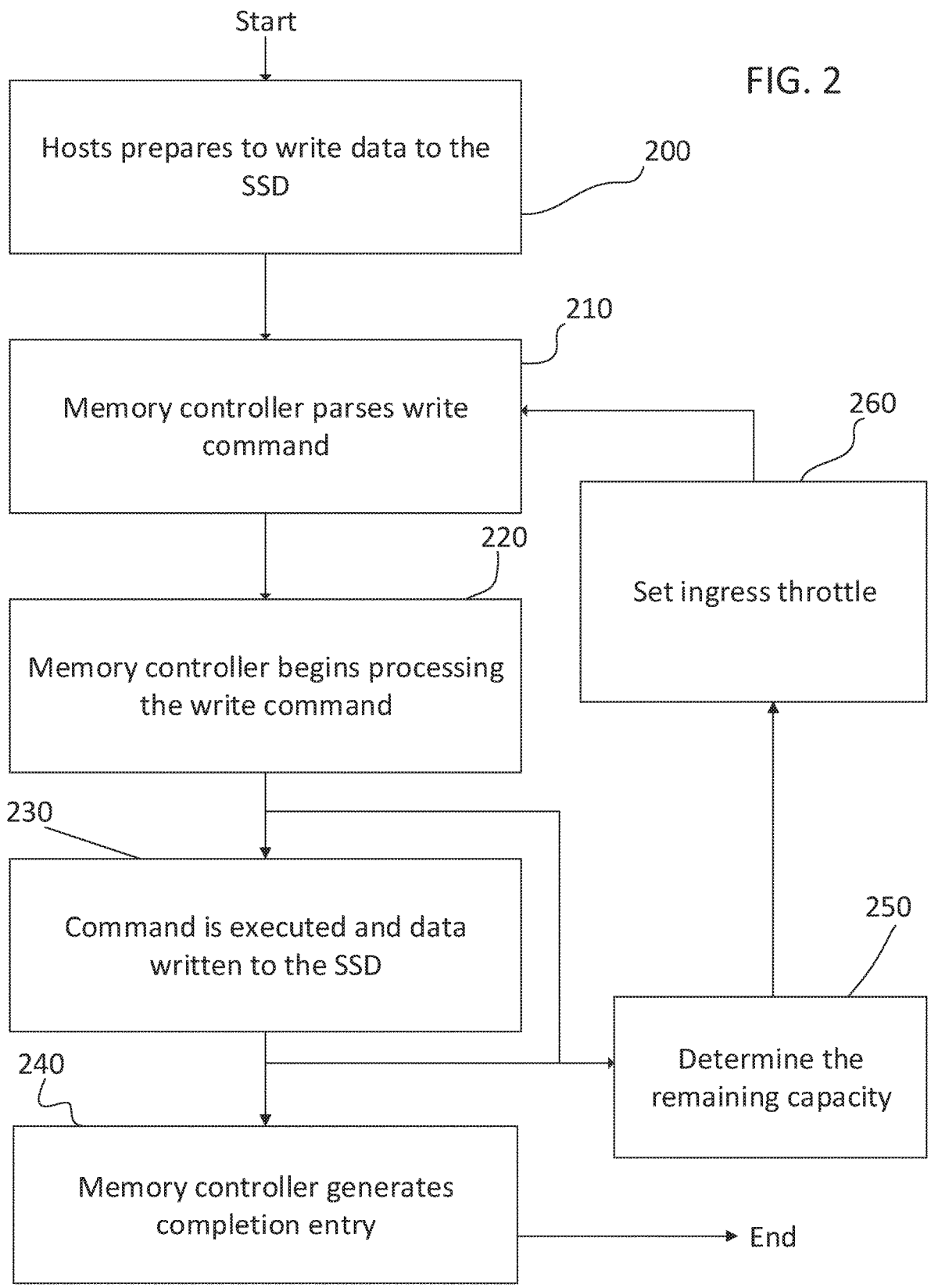

*400*

*450*

US 11,042,322 B2

SSD SUPPORTING LOW LATENCY OPERATION

FIELD OF THE INVENTION

This invention generally relates to solid state drive (SSD) supporting low latency operation through the use of command ingress throttling.

BACKGROUND OF THE INVENTION

Conventional SSD designs have primarily focused on obtaining a high average bandwidth or throughput for input and output (I/O) operations (i.e., reading and writing data). This may be achieved through parallelism in its architecture but the throughput rate generally does not match the rate at which a host may attempt to write data to the SSD. This results in problems noted below.

Generally, when a host writes data to an SSD, first it submits a write command and the associated data to be written to a submission queue and write data memory, respectively. An SSD memory controller will transfer the write command and corresponding data to an event queue and a write data buffer, respectively, of the SSD when the SSD is ready to process the write command and associated data.

While SSDs offer far greater I/O performance compared to traditional HDDs, hosts are able to submit write commands and the associated data to an SSD at a rate greater than the rate at which the SSD can execute the write commands. This may create a bottleneck. Further, the rate at which SSDs write data to the non-volatile memory varies based on a number factors such as the need for garbage collection or to extend the life of the SSD and that rate may decrease for certain periods of time.

If the SSD controller accepts too many write commands from the host at a rate greater than the rate at which the SSD can process those commands and write the associated data to the non-volatile memory, the event queue and the write data buffer may become full. This results in a spike in write-latency, as no new write commands and associated data can be accepted. Further, the SSD cannot process any sudden burst of urgent of write commands originating from the host.

Accordingly, there is a long felt need to address the problems noted above with an improved SSD to provide more consistent and predictable I/O operation throughput and performance.

BRIEF DESCRIPTION OF THE INVENTION

Certain aspects of the present invention are directed to a method of managing a sold state drive (SSD). The method includes determining a reaming capacity of an even queue storing write commands which are to be executed by the SSD. The write commands are transferred from the interface to the event queue at a dynamically set ingress throttle rate and associated write data is input into a write data buffer. The ingress throttle rate is set based on the remaining capacity of the event queue.

According to certain embodiments of the present invention, the ingress throttle rate is further set based on a determination of the remaining capacity of the write data buffer.

According to other embodiments of the present invention, the ingress throttle rate is reset after a predetermined period of time.

In other embodiments of the present invention, the ingress throttle rate is dynamically reset after a certain number of commands in the event queue have been executed.

In further embodiments of the present invention, the ingress throttle rate is further set based on the write amplification factor of the SSD.

According yet more embodiments of the present invention, the ingress throttle rate is based on one or more predefined parameters. In certain embodiments these parameters can include a desired number of write commands in the event queue, a desired amount of free slots in the event queue, a desired amount of write data in the write data buffer, a desired write data buffer remaining capacity, one or more PID controller parameters, or initial default throughput levels.

According to yet other embodiments of the present invention, the remain capacity of the event queue corresponds to the number of remaining free slots, where each slot corresponds to a write command.

According to some embodiments of the present invention, write commands are submitted at the tail of the submission queue and transferred to the event queue from the head of the submission queue.

In certain embodiments of the present invention, the invention further comprises executing at least one of the write commands in the event queue by writing the corresponding write data from the write data buffer to the non-volatile memory of the SSD.

BRIEF DESCRIPTION OF THE FIGURES

FIG. 2 is a flow chart of operations on an SSD, according to an embodiment of the invention.

DETAILED DESCRIPTION OF THE INVENTION

Figure 1A:
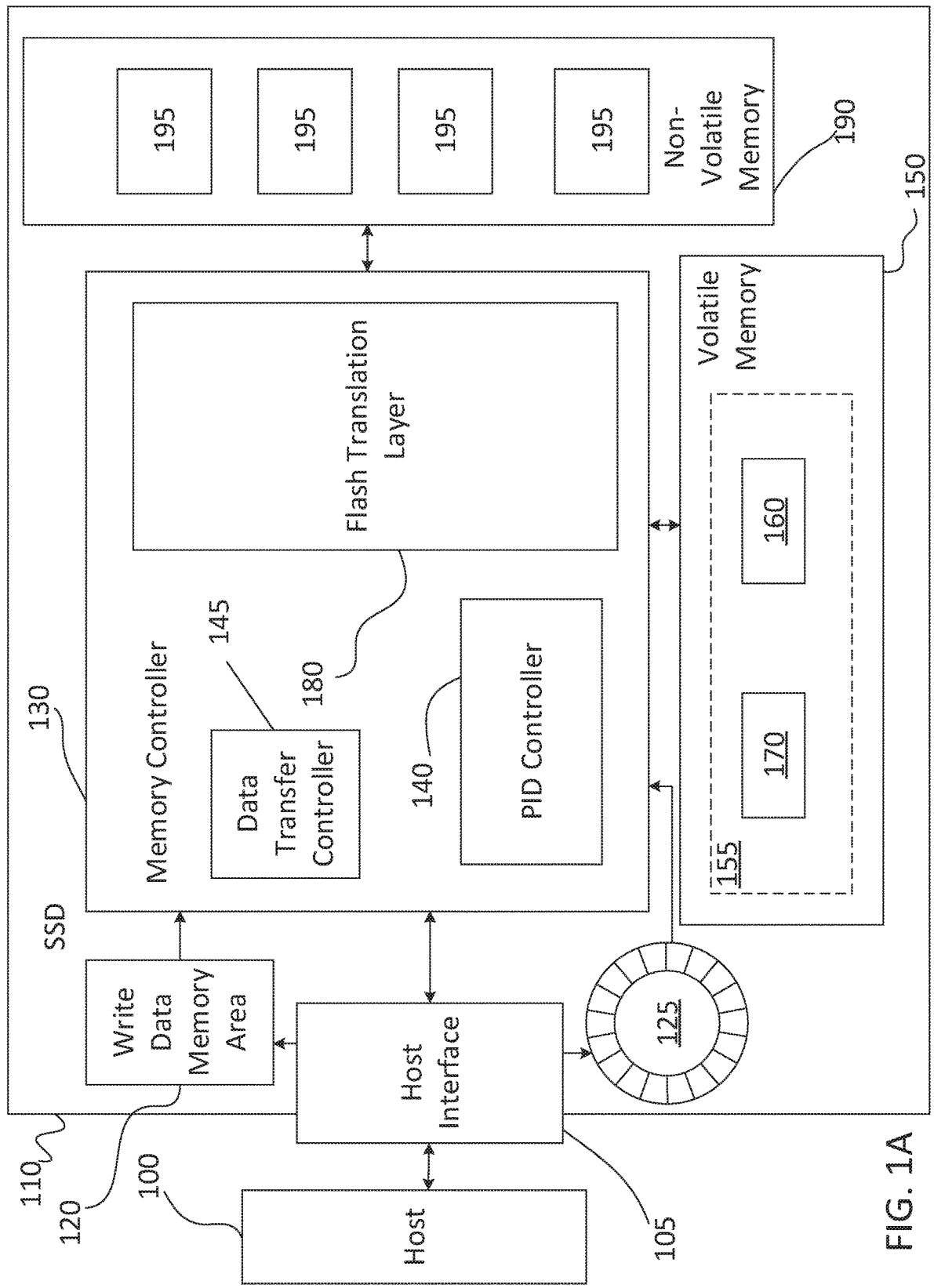
FIG. 1A is a block diagram of the structure of an SSD, according to an embodiment of the invention.

FIG. 1A illustrates a high-level block diagram of an SSD 110 in accordance with certain embodiments of the invention. SSD 110 is connectable to a host 100 via host interface 105. Although a single host 100 is shown, a person of ordinary skill in the art would understand that SSD 110 can be connected to any number of hosts without departing from the spirit of the invention.

SSD 110 may include a host interface 105, a write data memory area 120, a submission queue 125, a memory controller 130, a volatile memory 150, and a non-volatile memory 190, which comprise a plurality of non-volatile memory dies 195. The host interface 105 could be a SATA, M.2, or PCIe interface, and a person of ordinary skill in the art will appreciate that other suitable host interface could be implemented without departing from the spirit of the invention.

In some embodiments of the invention, memory controller 130 may additionally include a PID controller 140 and a flash translation layer 180.

For improved resilience and reliability, volatile memory 155 may store the event queue 160 and the write data buffer 170 in a power loss protection (PLP) buffer 155. The use of a PLP buffer allows volatile memory 150 preserve event queue 160 and the write data buffer 170 in case volatile memory 150 suffers a power loss event.

As illustrated by FIG. 1A, in certain embodiments, submission queue 125 and write data memory area 130 are stored within SSD 110. A person of ordinary skill in the art would understand that there could be a number of approaches for storing submission queue 125 and write data memory area 130. For example, submission queue 125 and write data memory area 130 could be stored in the volatile memory 150 or in separate controller memory buffers.

The submission queue 125 may be a circular buffer, which has a fixed sized buffer. As it becomes full, new entries would be written to the starting point of the buffer, overwriting the first entries placed in the circular buffer. However, a person of ordinary skill in the art would understand that there may be other implementations of the submission queue 125 without departing from the spirit of the invention, such as a stack buffer.

When host 100 needs to write data to the SSD 100, the host 100 submits a write command to the SSD 100 via the host interface 105 to submission queue 125. The host 100 places the write command at the tail of submission queue 125. In addition, the host 100 stores, using the host interface 105, the corresponding write data in a write data memory area 120. The write data is the data to be written to the non-volatile memory 190 of SSD 100. The write command contains information such as the starting location and length of the data within the write data memory area 120 that is to be written and the location, in the form of a logical block address, where that data is to be written to within the non-volatile memory 190. In some implementations, when the data to be written is sufficiently short in length, it may be located within the command itself, instead of within the write data memory area 120. In certain embodiments, the write data is a single write data unit. In other implementations, where the write data is large, the write data can consist of multiple separate write data units.

Figure 1B:
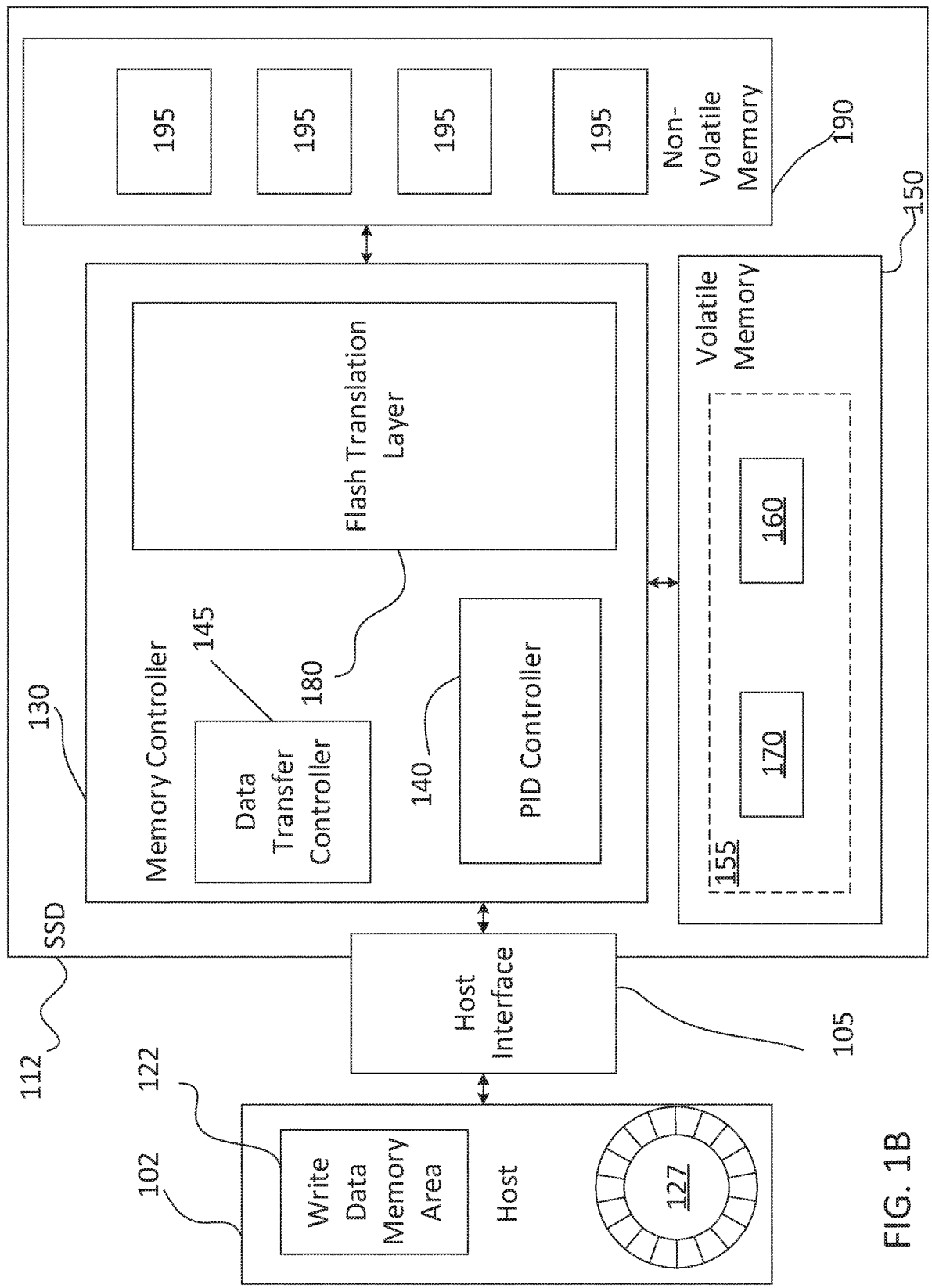
FIG. 1B is a block diagram of the structure of an SSD, according to an alternative embodiment of the invention.

FIG. 1B is the same as FIG. 1A except that the submission queue 127 and write data memory area 122 resides within memory in the host 102 in SSD 112. A person of ordinary skill in the art will understand that the placement of submission queue 127 and write data memory area 122 is not essential to the spirit of the present invention. Further, a person of ordinary skill in the art will understand that submission queue 125, 127 and write data memory area 120, 122 do not have to reside in the same location as illustrated in FIGS. 1A and 1B. Rather, it is entirely possible to have submission queue 125, 127 in one location and write data memory area 130, 132 in different (e.g. submission queue 127 resides in host 100, 102 and write data memory area 120 resides in the SSD 110, 112 and vice versa). Other than the aforementioned variations between FIG. 1A and FIG. 1B, the operation and functionality of the SSDs 110, 112 are the same.

In both FIG. 1A and FIG. 1B, the host 100, 102 notifies memory controller 130 that a new command has been added to the submission queue 125, 127. A person of ordinary skill in the art will understand that there are a number of methods for the host 100, 102 to notify the memory controller 130 that a new command has been entered in the submission queue 125, 127. For example, the host 100, 102 could update a doorbell register (not shown) to alert memory controller 130 of a new write command entry in the submission queue 125, 127.

In order to process a write command and ultimately store the associated data in non-volatile memory 190, the memory controller 130 retrieves a write command from the head of submission queue 125, 127. The memory controller 130 parses the write command and stores it as part of the queue of commands to be executed in the event queue 160. Parsing of the write commend identifies the starting location and length of the write data within the write data memory area 120, and the location and length is written to a data transfer controller 145 within memory controller 130. In some implementations the data transfer controller 145 may be a direct memory access (DMA) controller.

Thereafter, the data transfer controller 145 retrieves the write data from the write data memory area 120 and writes the write data to write data buffer 170. A person of ordinary skill in the art will understand that there are a number of methods to implement the write data buffer 170, such as implementing it as part of the host 100 volatile memory, in volatile memory 150, or elsewhere.

In the embodiments of FIGS. 1A and 1B, event queue 160 and write data buffer 170 reside in volatile memory 150. However, event queue 160 and write data buffer 170 may reside in other locations and memory types within SSD 110, 112. In other embodiments, event queue 160 and write data buffer 170 may be part of a power loss protection buffer 155, in order to help prevent issues that arise when there is a sudden loss of power to the volatile memory 150.

The flash translation layer 180 processes the write commands in the event queue 160 and writes the corresponding data to the non-volatile memory 190 of SSD 110, 112. Write data may be written to a plurality of nonvolatile memory dies 195, which may be divided into channels for ease of access and improved data throughput. Nonvolatile memory 190 may be NAND flash memory, however, a person of ordinary skill in the art will understand that a number of different implementation of SSD non-volatile memory 190, such as DRAM, may used without departing from the spirit of the invention.

Without control of the rate at which memory controller 130 retrieves write commands from the submission queue 125, 127 and the corresponding write data from write data memory area 120, 122, event queue 160, write data buffer 170, or both may become full unexpectedly. This occurs when the rate at which write commands and write data are transferred to the event queue 160 and write data buffer 170 exceeds the rate at which the SSD 110, 112 executes the write commands in the event queue 160 to store the write data in the non-volatile memory 190. If either event queue 160, or write data buffer 170 become full, there will be a spike or increase in write data latency with respect to the time it takes to store data in the non-volatile memory 190. This is because write commands will back up in submission queue 125, 127 as the host 100, 102 continues to submit write commands without knowing that status of event queue 160 and write data buffer 170.

In order to avoid or minimize increased write latency, memory controller 130 may throttle the ingress rate of write commands, the rate at which write commands are queued in the event queue. This is done dynamically, i.e., during operation of the SSD 110 112, and as a result the ingress throttle rate may be adjusted relative to changing operational requirements of the SSD 110, 112. In other words, the SSD controls, and adjusts, the rate at which it processes new write commands from the submission queue in order to avoid overfilling the event queue and/or the write data buffer.

The ingress throttle rate increases or decreases the rate at which the memory controller 130 retrieves and processes write commands from submission queue 125, 127 for placement in event queue 160 and retrieval of the corresponding write data from the write data memory area 120, 122 for placement in the write data buffer 170 so that event queue 160 and write data buffer 170 are kept at, or close to, a desired capacity. Depending on factors, such as the need for garbage collection or the need to meet certain parameters to extend the life of the SSD 110, 112 (e.g. thermal throttling to prevent overheating of the SSD 110, 112, which may damage the non-volatile memory dies 195), the desired capacity level may fluctuate throughout the operation of SSD 110, 112.

In certain embodiments of the present invention PID controller 140 is used to calculate the appropriate ingress throttle. The PID controller provides a means whereby the ingress throttle rate is adjusted such that the available capacity of the event queue and the write data buffer are kept as close to the desired or optimum values and the system can respond to fluctuations in the host's I/O command submission pattern in a timely manner without overshooting or undershooting.

In certain embodiments, where there are a plurality of submissions queues (not illustrated) the memory controller 130 will apply the appropriate ingress throttle rate to all of the submission queues. The memory controller 130 will process the commands from the submissions queues in an equitable manner. For example, the memory controller 130 may process a certain number of commands from each of the submissions queues evenly or the memory controller 130 may process a certain number of commands from each of the submissions queues such that an even amount of write data is stored in the write data buffer 170. A person of ordinary skill in the art will understand that there are number of ways for the memory controller 130 to process write commands from a plurality of submission queues to satisfy the ingress throttle rate.

FIG. 2 illustrates a flow chart of storing data on an SSD in accordance with certain embodiments of the present invention. At step 200, the host, or an application on the host, determines that it needs to store data on the SSD. The host submits a write command to a submission queue and stores the corresponding write data, the data that the host wants to write to the SSD, in a write data memory area. The host also updates a doorbell register to identify the new tail position of the submission queue and in order to alert the SSD memory controller that a new write command has been submitted to the submission queue. In certain embodiments of the present invention, there can be more than one submission queue.

At Step 210, the memory controller retrieves a write command from the head of the submission queue. In order to prevent either the event queue or the write data buffer from becoming full, the memory controller retrieves commands from the submission queue at a throttled rate, a write command ingress throttle rate. The memory controller parses the retrieved write command and identifies the beginning location of the corresponding write data in the write data memory area and the overall length of the write data. This information is stored in the data transfer controller. The data transfer controller can be part of the SSD memory controller, or a separate distinct controller within the SSD.

At Step 220, the memory controller places the parsed write command into a free slot in the event queue. Additionally, the data transfer controller retrieves the write data from the write data memory area and writes it to the write data buffer.

At Step 230, the flash translation layer of the SSD process a parsed write command from the event queue, translates any logical addresses to physical addresses in the non-volatile memory, and stores in the data transfer controller the address and length of the corresponding write data in the write data buffer and the physical address of the destination in the non-volatile memory. The data transfer controller retrieves the write data from the write data buffer and writes it to the non-volatile memory of the SSD. In some implementations, Step 230 may be omitted as part of the host command processing and conducted instead as part of a separate process by the memory controller at a later time. After Step 230 is complete, the write data is now stored in the SSD long term.

At Step 240, the memory controller places an entry into a completion queue and notifies the host. The completion queue could be stored in the SSD (e.g. as a controller memory buffer) or it could be stored within the host itself. Regardless, an entry in the completion queue and the notification alerts the host that the write data has been written to the non-volatile memory of the SSD. In cases where Step 230 has been omitted, the memory controller still completes Step 240, but conducts Step 230 at a later time to ensure the write data has been written to the non-volatile memory of the SSD as notified to the host. A person of ordinary skill in the art would understand that any number of implementations of the completion queue, such as a circular buffer or stack buffer, can used without departing from the spirit of the invention.

At Step 250, the memory controller determines the remaining available capacity of the event queue and the write data buffer. This can occur at anytime after a write command has been parsed and place in the event queue and the corresponding write data has been stored in the write data buffer. For example, the remaining capacities could be determined as soon as a write command is entered into the event queue. Alternatively, as another example, the remaining capacities can be determined after the write data has been successfully written to the non-volatile memory of the SSD, (i.e. the write command has been fully executed). In some implementations, the remaining capacities may be determined at fixed time intervals, unrelated to the processing of host commands A person of ordinary skill in the art would appreciate that the determining of remaining capacities could occur at a number of points throughout the operation of the SSD without departing from the spirit of the invention.

At Step 260, the memory controller determines the ingress throttle rate, the rate at which the memory controller accepts new write commands from the submission queue, based on the remaining available capacity of event queue and/or the write data buffer. Additionally, other variables and parameters can be used to help calculate the ingress throttle. Some of these variables may be calculated on board the SSD itself. For example, an adjusted write amplification factor can be used to help calculate the ingress throttle. Further, some other variables may be loaded into the system via a configuration file. For example, the configuration file can contain the default ideal target levels of the remaining capacities for the write data buffer and/or the event queue and a measure of the ideal write performance of the SSD when it is first started for the first time (using initial default throughput levels, where the ingress throttle will be at its minimum possible value). In cases where the memory controller additionally relies on a PID controller to calculate the ingress throttle, the configuration file may supply certain PID controller parameters, for example, the gain constants used in the proportional, integral and differential calculations and the target or desired values of available capacity of the event queue and/or write data buffer. In certain embodiments of the present invention, there may be more than one PID controller, and each of the controllers would have its own set of PID controller parameters. A person of ordinary skill in the art would appreciate that a number of variables may be used to fine tune the ingress throttle and that these variables may be different depending on the desire operation of the SSD (e.g. higher write performance or a desire for an increased lifespan of the SSD).

Additionally, a person of ordinary skill in the art would appreciate that the ingress throttle does not need to be calculated after every new write command is accepted from the submission queue. The ingress throttle could be calculated at predetermined intervals, such as after a fixed number of write commands have been accepted from the submission queue, or executed by writing the write data to the non-volatile memory. The ingress throttle could also be calculated at variable intervals. For example, if current ingress throttle is successfully maintaining the remaining capacities of the write data buffer and/or the event queue at desired levels for extend periods of time, the ingress throttle may be calculated less often. However, if the controller is consistently under-filling or over-filling the event queue and/or write data buffer, it may be desired that the ingress throttle be calculated at an increasingly greater rate to help stabilize the remaining available capacity of the write data buffer and/or the event queue at the desired levels.

Figure 3:
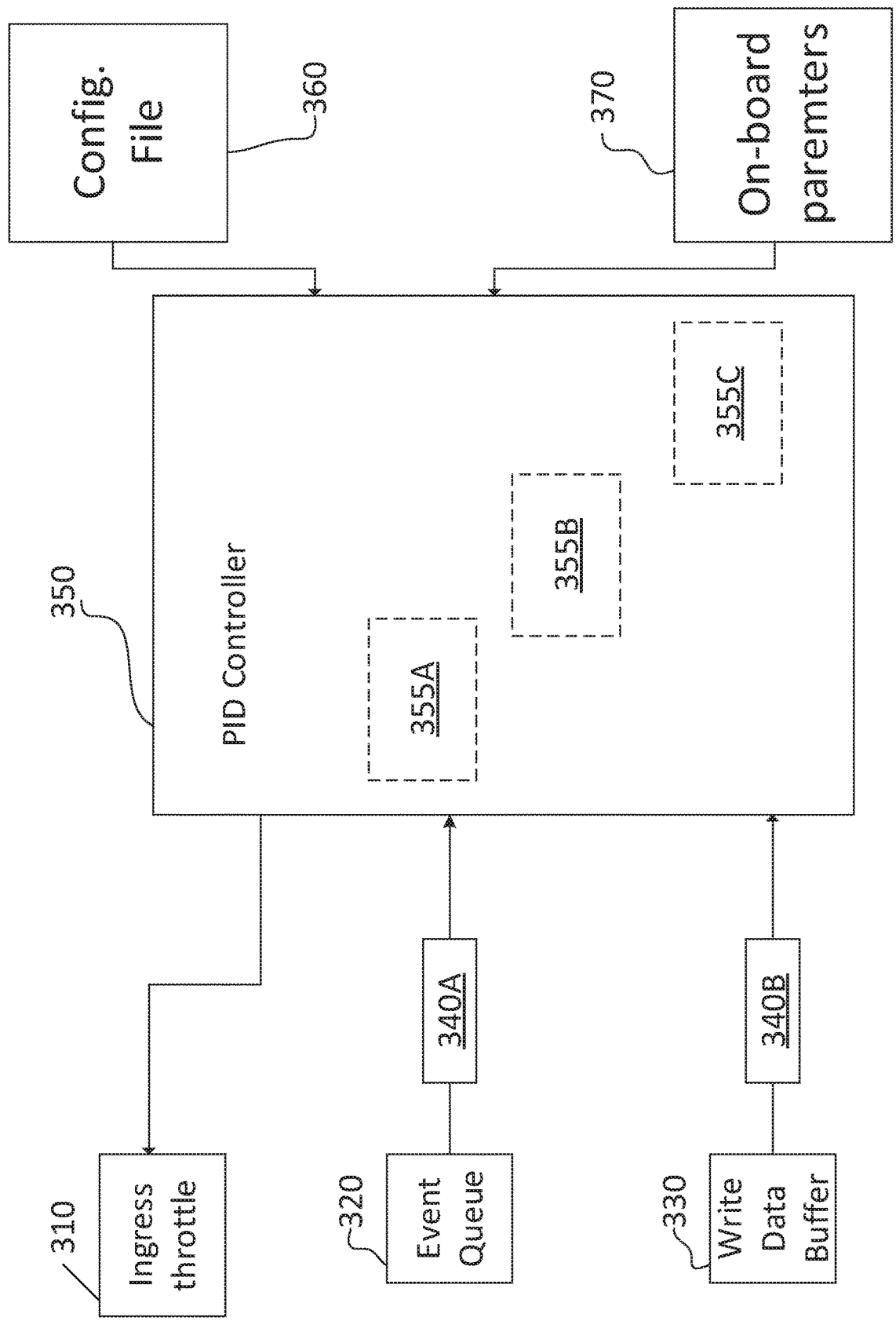
FIG. 3 is a block diagram of the operation of proportional integral derivative (PID) controller, according to an embodiment of the invention.

FIG. 3 illustrates a block diagram of the operation of a PID controller 350. In certain embodiments of the present invention, the memory controller of the SSD contains a PID controller 350, which sets the ingress throttle rate 310.

PID controller 350 receives information about the number of items in (or, equivalently, the remaining available capacity of) the event queue 320 and/or the amount of data in (or, equivalently, the remaining available capacity of) the write data buffer 330. Prior to receiving this information, the information may be processed by low-pass filters 340A and 340B. The low pass filters provide a means to smooth the signals being input to the PID controller 350 and prevent the PID controller 350 from responding to spikes or rapid changes in the event queue or write data buffer (for example due to a large number of write commands all arriving at once; commands with large amounts of data all arriving at once (which may cause write data buffer to fill very quickly) or being processed at once (which may cause the write data buffer to empty very quickly).

Further, certain on board parameters 370 may also be provided to the PID controller 350 help calculate a more effective ingress throttle rate. These parameter may include the write amplification factor of the SSD, whether the SSD needs to or is conducting reclaim or garbage collection operations, operation parameters, such as the current temperature or the number of program/erase cycles for certain portion of the non-volatile memory. The weight these parameters are given in calculating the ingress throttle rate may vary depending on the desired goals of the SSD (e.g. higher performance or an extend lifespan).

Another on board parameter 370 that may be used to further refine the calculation of the ingress throttle rate by PID controller is a write amplification factor. Write amplification is typically expressed as the ratio of the number of bytes written to the physical memory locations of an SSD to the number of bytes written to logical memory locations in the SSD (i.e., number of host writes). Generally, random writes of small blocks of data produces greater write amplification than sequential writes of large blocks of data. As more data is written to an SSD and its logical capacity is consumed, the number of memory blocks available for erasure and re-writing is reduced; the fewer the number of erased blocks available at any time in an SSD to accept new data, the higher the write amplification will be. In some implementations, the number of memory blocks available for erasure may be used as an on board parameter 370 instead of the write amplification factor.

Although write amplification factors may be difficult to calculate, a number of techniques exist for estimating or determining an adjusted write amplification factor. For example, U.S. patent application Ser. No. 15/915,716 ("Workload-Adaptive Overprovisioning in Solid State Storage Drive Arrays") describes on such novel approach and is hereby incorporated by reference.

The ingress throttle calculation performed by the PID controller 350 may be further modified or informed by configuration file parameters 360. Configuration file parameters 360 may include, default ideal target levels of the remaining capacities for the write data buffer and/or the event queue and a measure of the ideal write performance of the SSD when it is first started for the first time (initial default throughput levels), or parameters for the PID controller 350 itself. A person of ordinary skill in the art would appreciate that other predetermined configuration file parameters may beneficial to help achieve desired SSD performance, and to define which trade-offs the SSD should make (e.g. improving performance or extending the life span of the SSD).

Based on the remaining available capacity information provided by event queue 320 and/or write data buffer 330 and, if implemented, the on-board variables and parameters 370 and the configuration file parameters 360, the PID controller 350 calculate the ingress throttle using the sum of three distinct calculations. The calculations are a proportional calculation 355A, integral calculation 355B and a derivative calculation 355C.

The PID controller 350 performs these calculations individually and continuously, where the difference between the desired value and the actual value (of optimum available capacity of, or the optimum number of items in, the event queue 320 and/or the optimum availably capacity of, or amount of data in, the write data buffer) is used as the basis of the calculations. In the case of the proportional calculation 355A, the calculation involves multiplying this difference by a fixed constant (making the output of the calculation either proportional, or inversely proportional, to the difference, depending on whether the number of items/amount of data or the remaining available capacity is measured). In the case of the integral calculation 355B, the difference is integrated (summed) over a period of time, then multiplied by a second constant. In the case of the derivative calculation 355C, the rate of change of the difference (i.e. the first derivative) is calculated and multiplied by a third constant. The output of all three calculations is summed may be used as the ingress throttle value.

In certain embodiments of the present invention, there is more than one PID controller 350. Each PID controller 350 would be responsible for a distinct ingress throttle rate 310, which would be set based on distinct event queues 320, write data buffers 330, configuration file parameters 360 and on-board parameters 370.

Figure 4A:
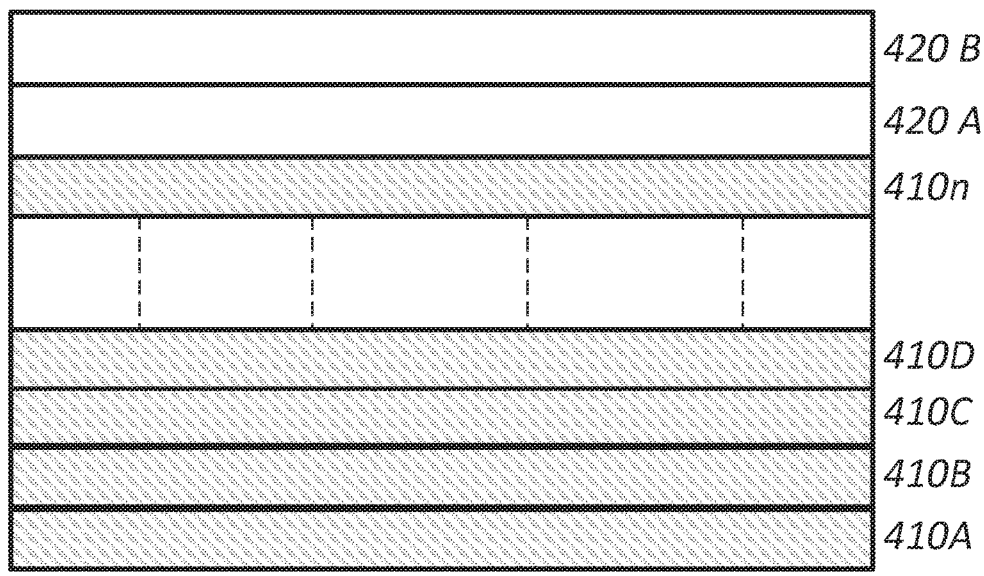
FIG. 4a is a diagram of the remaining capacity in the event queue, according to an embodiment of the invention.

FIG. 4A is an exemplary illustration of an event queue 400 discussed throughout the present invention. When the SSD controller retrieves a write command from the submission queue the command is parsed, and place in the first free slot available 420A. Previously parsed commands are stored in occupied slots 410A-410n until the flash translation layer of the SSD is able to process the command and write the corresponding write data to the non-volatile memory of the SSD. After the corresponding write data has been written to the non-volatile memory of the SSD, the occupied slot is freed for reuse.

Throughout this process the firmware of the SSD memory controller keeps track of remaining capacity of event queue 400. In some implementations, hardware logic maintains firmware-accessible registers containing the remaining capacity of the event queue 400 and write data buffer 330. One approach, in accordance with the present invention, to keep track of the remaining capacity of the event queue 400 is to keep track of the number of remaining free slots, each free slot could correspond to a single write command, in this case the two free slots represented by 420A and 420B. Alternatively, the number of occupied slots 410A-410n can be tracked. Unlike the write data associated with the write command, the write command itself is of a relatively uniform size such that one command occupies one slot, and accordingly the remaining capacity of the event queue is correlated to the number of occupied slots 410A-410n or free slots 420A and 420B. However, a person of ordinary skill in the art would understand that other approaches for event queues and tracking of event queue capacities may be implemented without departing from the spirit of the invention.

Figure 4B:
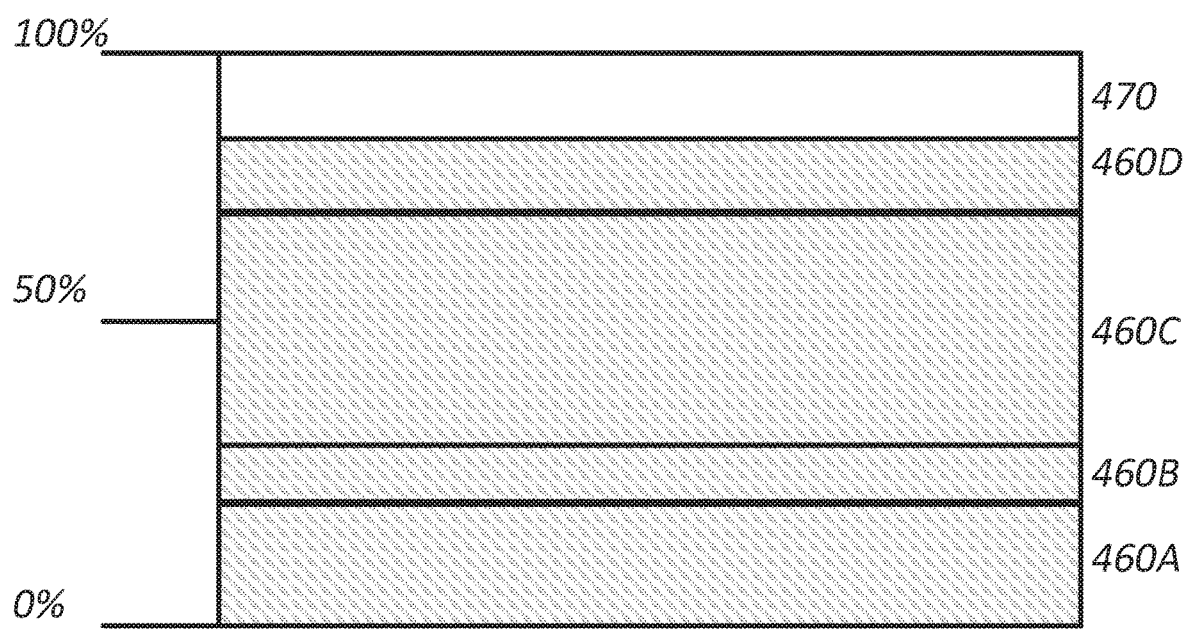
FIG. 4b is a diagram of the remaining capacity in the write data buffer, according to an embodiment of the invention.

FIG. 4B is an exemplary illustration of a write data buffer 450 discussed throughout the present invention. When the SSD controller retrieves a write command from the submission queue the command is parsed, and the associated write data 460A, 460B, 460C, or 460D is retrieved from the write data memory area and stored in the write data buffer. As write commands are processed from the event queue, the corresponding write data 460A, 460B, 460C, or 460D is written from the write data buffer 450 to the non-volatile memory of the SSD by the flash translation layer. After the write data 460A, 460B, 460C, or 460D is written from the write data buffer 450 to the non-volatile memory of the SSD by the flash translation layer, the space occupied by write data 460A, 460B, 460C, or 460D can be overwritten thus creating additional free space 470.

Unlike the write commands to which they correspond, write data 460A, 460B, 460C, and 460D is not of any uniform size. It is possible for the write data corresponding to one write command to be markedly larger than write data corresponding to a different write command Thus, the remaining capacity of write data buffer 450 cannot always be, but in certain instances could be, tracked using the same methods as implemented for tracking the remaining capacity of the event queue. One approach would be to keep track of the percentage of the write data buffer that is occupied by write data 460A, 460B, 460C, and 460D.

FIGS. 4A and 4B are meant to illustrate key concepts pertaining to the invention. However, a person of ordinary skill in the art would understand that other measures of capacity can be used without departing from the spirt of the invention, such as measuring the amount of free space remaining in the write data buffer or estimating the remaining capacity of the write data buffer based on the number of occupied slots in the event queue. Further, a person of ordinary skill in the art would understand that the number of commands and write data illustrated in FIGS. 4A and 4B is merely exemplary, not intended to limit the claimed invention in any manner, and that a number of different sizes and approached to write data buffers and event queues can be implemented without departing from the spirit of the invention.

Figure 5:
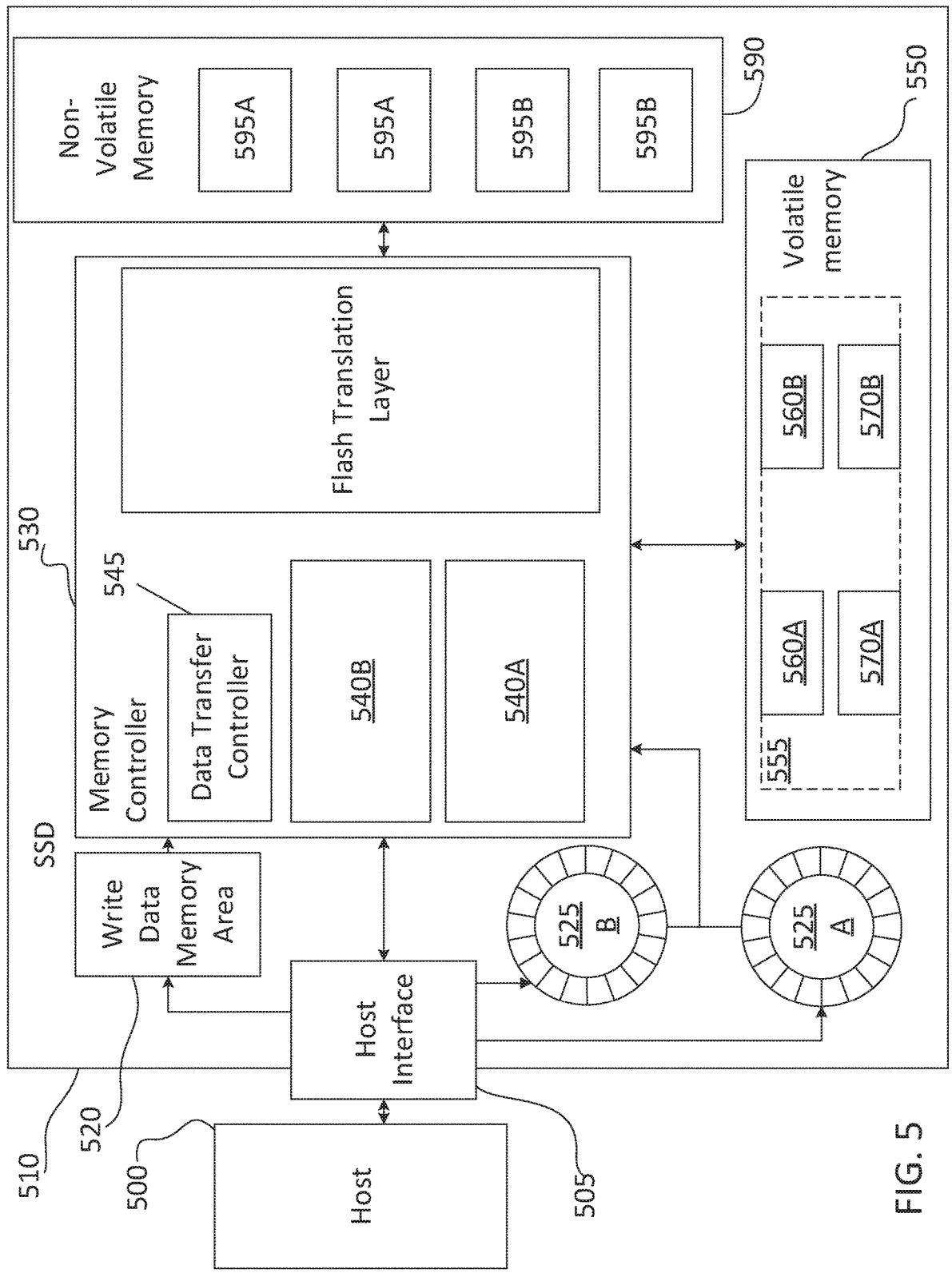
FIG. 5 is a block diagram of the structure of an SSD storing data using NVMe sets, according to an embodiment of the invention.

FIG. 5 illustrates a block diagram of an SSD in accordance with the present invention similar to that of FIG. 1A, but where the SSD stores data in NVMe sets. Although many elements of SSD 500 overlap with SSD 100 of FIG. 1A or SSD 112 of FIG. 1B, unlike the SSDs of FIGS. 1A and 1B, the non-volatile memory dies 595A and 595B are logically and physically separated into distinct sets. No one non-volatile memory die 595A or 595B associated with one set is associated with any other set. Data sets associated with a particular set of non-volatile memory dies 595A or 595B can only be stored on the non-volatile memory dies belonging to the particular set. The data sets associated with one set of non-volatile memory dies 595A or 595B are addressed such that they are logically distinct from data sets associated with other sets of non-volatile memory dies 595A or 595B. Conceptually, from the perspective of the host which communicates with the SSD 510 using host interface 505, the distinct sets may be view as an SSD within the SSD 510.

One possible implementation of the aforementioned sets of non-volatile memory dies 595A or 595B are NVMe sets. However, a person of ordinary skill in the art will recognize that NVMe sets are defined by the NVMe standard and the general concept of sets can be implement without complying with the NVMe standards. Accordingly, a person of ordinary skill in the art would understand there are numerous methods to implement set-specific data storage.

In order to maintain logical separation between the non-volatile memory dies 595A and 595B of non-volatile memory 590, certain elements must be duplicated throughout SSD 510 for each set. For example, when host 500 wishes to write data to SSD 510, the host submits a write command to a particular submission queue 525A or 525B depending on the set associated with the write command. However, not all elements need be duplicated. For example, while the write commands are submitted to distinct submission queues 525A or 525B, the corresponding write data can be stored in a singular write data memory area 520 regardless of which set it is associated with.

In turn, memory controller 530 retrieves and parses the write command from a particular submission queue 525A or 525B. The parsed write command is stored in a set-specific event queue 560A or 560B, depending on the set associated with the corresponding write command. Likewise, when the data transfer controller 545 retrieves the corresponding write data from write data memory area 520, the write data is stored in a set-specific write data buffer 570A or 570B, depending on the set associated with the write command. For ease of understanding, submission queues 525A and 525B, and write data area 520 are illustrated as part of the SSD 510, where they can be stored in volatile memory 550 or alternative locations such as dedicated controller memory buffers. However, a person of ordinary skill in the art would understand that submission queues 525A and 525B, and write data area 520 can be stored in different locations without departing from spirit of the invention. For example, akin to FIG. 1B, submission queues 525A and 525B, and write data area 520 can be stored in the host 500. Further, a person of ordinary skill in the art would understand that submission queues 525A and 525B, and write data area 520 do not all need to be stored in the same location or manner.

Although it would not depart from the spirit of the invention, it is not necessary for the set-specific event queues 560A or 560B and set-specific write data buffers 570A or 570B to be segregated to different volatile memory portions of the SSD 510 and the set-specific event queues 560A or 560B and set-specific write data buffers 570A or 570B can all be stored in volatile memory 550. Likewise, the set-specific event queues 560A or 560B and set-specific write data buffers 570A or 570B can be segregated within the volatile memory 550 into a power loss protection buffer 555.

Further, flash translation layer 580 executes the commands in the set-specific event queues 560A or 560B by writing the corresponding write data stored in set-specific write data buffers 570A or 570B to the non-volatile memory dies 595A or 595B depending on the set associated with the write command.

In SSD 510, each unique set has its own ingress throttle set by controller 530 based on the remaining capacity of the corresponding set-specific event queue 560A or 560B and/or set-specific write data buffer 570A or 570B. These set-specific ingress throttles can be further refined using set-specific on-board or configuration file parameters.

In embodiments which rely on a PID controller to set the ingress throttle, there is a set-specific PID controller 540A or 540B for each of the NVMe sets. Each set-specific PID controller 540A or 540B may have its own configuration file parameters.

Figure 6:
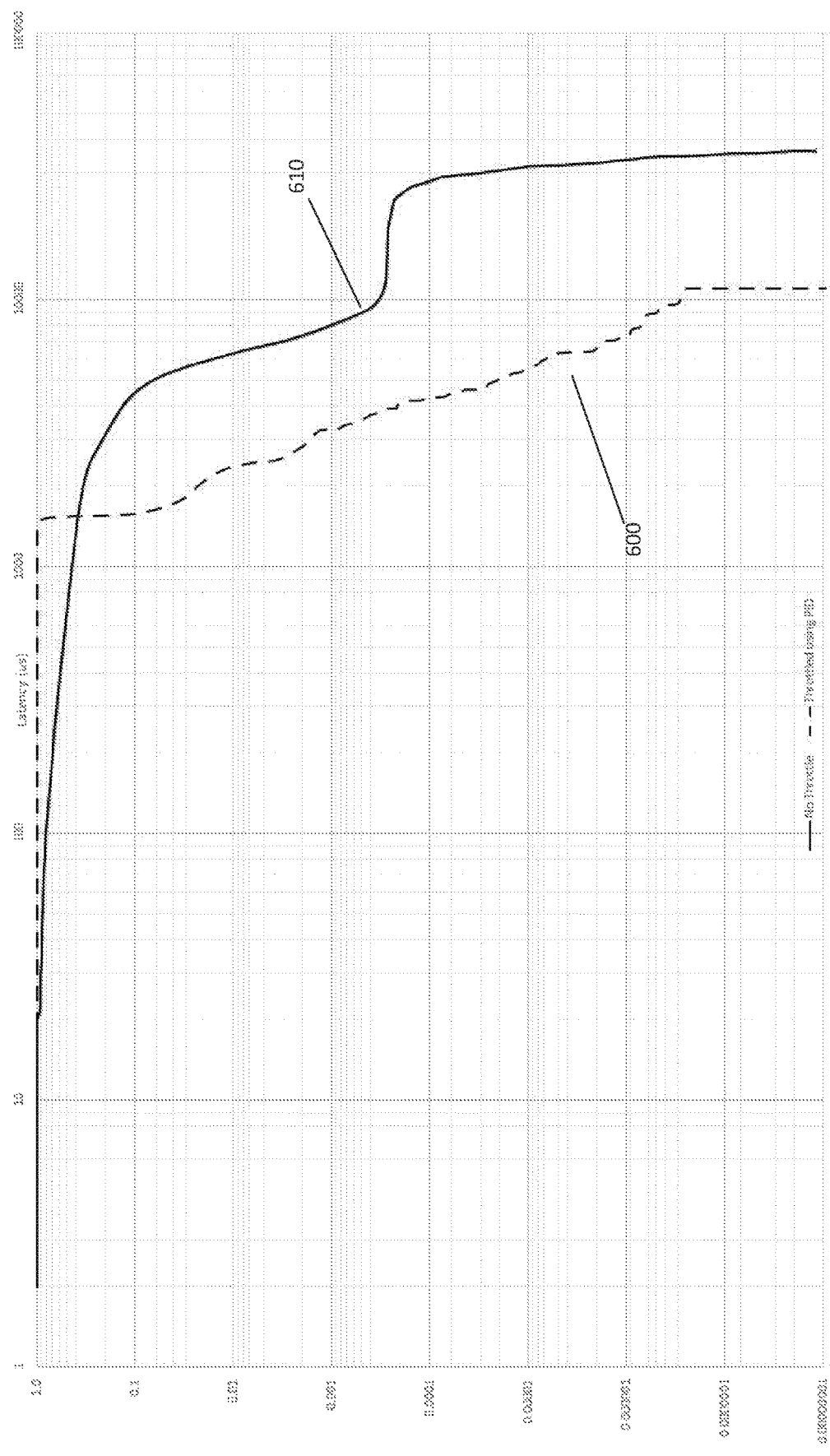
FIG. 6 is a chart showing the difference in write latency between a traditional SSD and an SSD, according to an embodiment of the invention.

FIG. 6 illustrates a chart comparing the latency experienced with and without implementing the ingress throttle according to certain embodiments of the present invention in a simulation processing millions of write commands Latency, denoted on the horizontal axis, is shown in microseconds for ease of illustration but will be described herein in milliseconds for ease of comparison and understanding. The vertical axis represents the proportion of commands suffering from the latency. That is, 0.1 on the vertical axis represents the latency affecting 1 out of every 10 write commands, 0.01 on the vertical axis represents the latency affecting 1 out of every 100 write commands, and so on in magnitudes of 10.

Commands according to certain embodiments of the present invention 600, suffer from smaller latency than commands in accordance with the prior art 610. For example, 1 in 10 commands according to certain embodiments of the present invention 600 suffer a latency of 1.5 millisecond or more whereas 1 in 10 commands in accordance with the prior art 610 suffer a latency of 4.5 milliseconds or more. The difference becomes more extreme in more exceptional circumstances. For example, 1 in 1,000,000 commands according to certain embodiments of the present invention 600 suffer a latency of 10 millisecond or more whereas 1 in 1,000,000 commands in accordance with the prior art 610 suffer a latency of 35 milliseconds or more. Certain embodiments of present invention provide more stable, predictable, and lower latency compared with systems that do not implement an ingress throttle.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

Further, a person of ordinary skill in the art would understand that certain aspects of this invention, such as the various controllers, may be implemented as hardware, software, firmware or a combination thereof. The descriptions of such elements in the present invention are not intended to limit the implementation of these types of elements to a singular implementation. A person of ordinary skill in the art would appreciated that there are number ways to implement certain elements of the present invention without departing from the spirit of the invention itself.

Additionally, elements reference through the present invention can be divided into certain sub-elements, combined, or duplicated without departing from the spirit of the invention.

What is claimed is:

1. A method of managing writing data to a Solid State Drive (SSD), the method comprising:
    determining a remaining capacity of an event queue for queuing write commands for execution by the SSD;
    dynamically setting, during operation of the SSD, an ingress throttle rate of write commands transferred from a host interface to the event queue based on the remaining capacity of the event queue;
    determining a remaining capacity of the write data buffer for storing data associated with write commands stored in the event queue; and
    dynamically setting the ingress throttle rate based on the remaining capacity of the write data buffer,
    transferring, at the ingress throttle rate, at least one write command of a plurality of write commands from the host interface to the event queue; and
    inputting write data associated with the at least one write command into a write data buffer.

2. The method of claim 1, the method further comprising dynamically resetting the ingress throttle after a predetermined time period.

3. The method of claim 1, the method further comprising dynamically resetting the ingress throttle after a predetermined number of the write commands in the event queue have been executed.

4. The method of claim 1, wherein dynamically setting the ingress throttle is further based on a write amplification factor of the SSD.

5. The method of claim 1, wherein dynamically setting the ingress throttle is further based on one or more predefined parameters.

6. The method of claim 4, wherein the predefined parameters are one or more of a desired number of write commands in the event queue, a desired amount of free slots in the event queue, a desired amount of write data in the write data buffer, a desired write data buffer remaining capacity, one or more PID controller parameters, or initial default throughput levels.

7. The method of claim 1, wherein the remaining capacity of the event queue corresponds to a number of remaining free slots in the event queue, each slot associated with one write command.

8. The method of claim 1, the method further comprising:
    submitting a new write command at a tail of a submission queue; and wherein the transferring of the at least one command of the plurality of write commands from the host interface to the event queue is transferring one of the plurality of write commands at a head of the submission queue.

9. The method of claim 1, the method further comprising:
executing one or more of the at least one write commands in the event queue by writing the write data associated with the at the one or more write commands to a non-volatile memory of the SSD.

10. A solid state drive (SSD) comprising:
a host interface and a memory controller, the memory controller configured to:
receive a plurality of write commands from a host via the host interface;
determine a remaining capacity of an event queue for storing the plurality of write commands received from the host interface;
dynamically set, during operation of the SSD, an ingress throttle rate of write commands transferred from the host interface to the event queue based on the remaining capacity of the event queue;
determining a remaining capacity of the write data buffer for storing data associated with write commands stored in the event queue; and
dynamically set the ingress throttle rate based on the remaining capacity of the write data buffer;
transfer, at the ingress throttle rate, at least one write command of a plurality of write commands from the host interface to the event queue; and
input, write data associated with the at least one write command into a write data buffer.

11. The SSD of claim 10, wherein the memory controller is further configured to:
dynamically reset the ingress throttle after a predetermined time period.

12. The SSD of claim 10, wherein the memory controller is further configured to:
dynamically reset the ingress throttle after a predetermined number of the write commands in the event queue have been executed.

13. The SSD of claim 10, wherein the memory controller is further configured to:
further dynamically set the ingress throttle based on the write amplification factor of the SSD.

14. The SSD of claim 10, wherein the memory controller is further configured to:
further dynamically set the ingress throttle further based on one or more predefined parameters.

15. The SSD of claim 14, wherein the predefined parameters are one or more of a desired number of write commands in the event queue, a desired number of free, a desired amount of free slots in event queue, a desired amount of write data in the write data buffer, a desired write data buffer remaining capacity, one or more PID controller parameters, or fresh-out-of-the-box throughput levels.

16. The SSD of claim 10, wherein the remaining capacity of the event queue corresponds to a number of remaining free slots in event queue, each slot associated with one write command.

17. The SSD of claim 10, wherein the host is configured to place a new write command at a tail of a submission queue, and the memory controller is further configured to transfer the at least one command of the plurality of write commands from a head of the submission queue to the event queue.

18. The SSD of claim 10, wherein the memory controller is further configured to:
execute one or more of the plurality of write commands in the event queue by writing the write data associated with the at the one or more write commands to a non-volatile memory of the SSD.

19. The SSD of claim 10, wherein the memory controller comprises a PID controller configured to set the ingress throttle.

20. The SSD of claim 10, further comprising a power loss protection buffer and wherein the write data buffer and the event queue are stored in the power loss protection buffer.

* * * * *